United States Patent
Upton

[15] 3,699,315
[45] Oct. 17, 1972

[54] FLUID DISPENSING MONITOR

[72] Inventor: Douglas J. Upton, 18740 Devonshire, Los Angeles, Calif. 91324

[22] Filed: Aug. 14, 1969

[21] Appl. No.: 849,980

[52] U.S. Cl. .............. 235/92 FL, 235/92 R, 235/94, 235/92 TF, 222/23, 235/151.34
[51] Int. Cl. ........................... G06m 3/00, B67d 5/22
[58] Field of Search .......... 235/92, 29 FL, 24, 57, 65, 235/94, 151.34; 222/23

[56] References Cited

UNITED STATES PATENTS

| | | | |
|---|---|---|---|
| 3,467,279 | 9/1969 | Upton et al. | 235/92 FL |
| 3,231,135 | 1/1966 | Starbuck et al. | 235/94 X |
| 3,252,654 | 5/1966 | Deutch | 235/94 |
| 2,851,596 | 9/1958 | Hilton | 235/92 |
| 2,721,702 | 10/1955 | Beverley | 235/92 |

Primary Examiner—Maynard R. Wilbur
Assistant Examiner—Joseph M. Thesz, Jr.
Attorney—Roger A. Marrs

[57] ABSTRACT

A device for monitoring the volume of liquid dispensed through a valve and for indicating the equivalent monetary value of the amount of liquid dispensed even through the liquid may be dispensed in glasses and pitchers having different prices per unit volume and even though a different amount of liquid may be required to properly fill consecutive glasses or pitchers. The present fluid dispensing monitor includes a readout which indicates the monetary value of the glass or pitcher before the container is completely filled and ceases operation for a period of time sufficient to enable the glass or pitcher to be completely filled. In addition, the present monitor includes a time delay which delays incrementing of the readout after the start of the dispensing of liquid so that small amounts of liquid may be added to the glasses or pitchers after they are filled.

16 Claims, 4 Drawing Figures

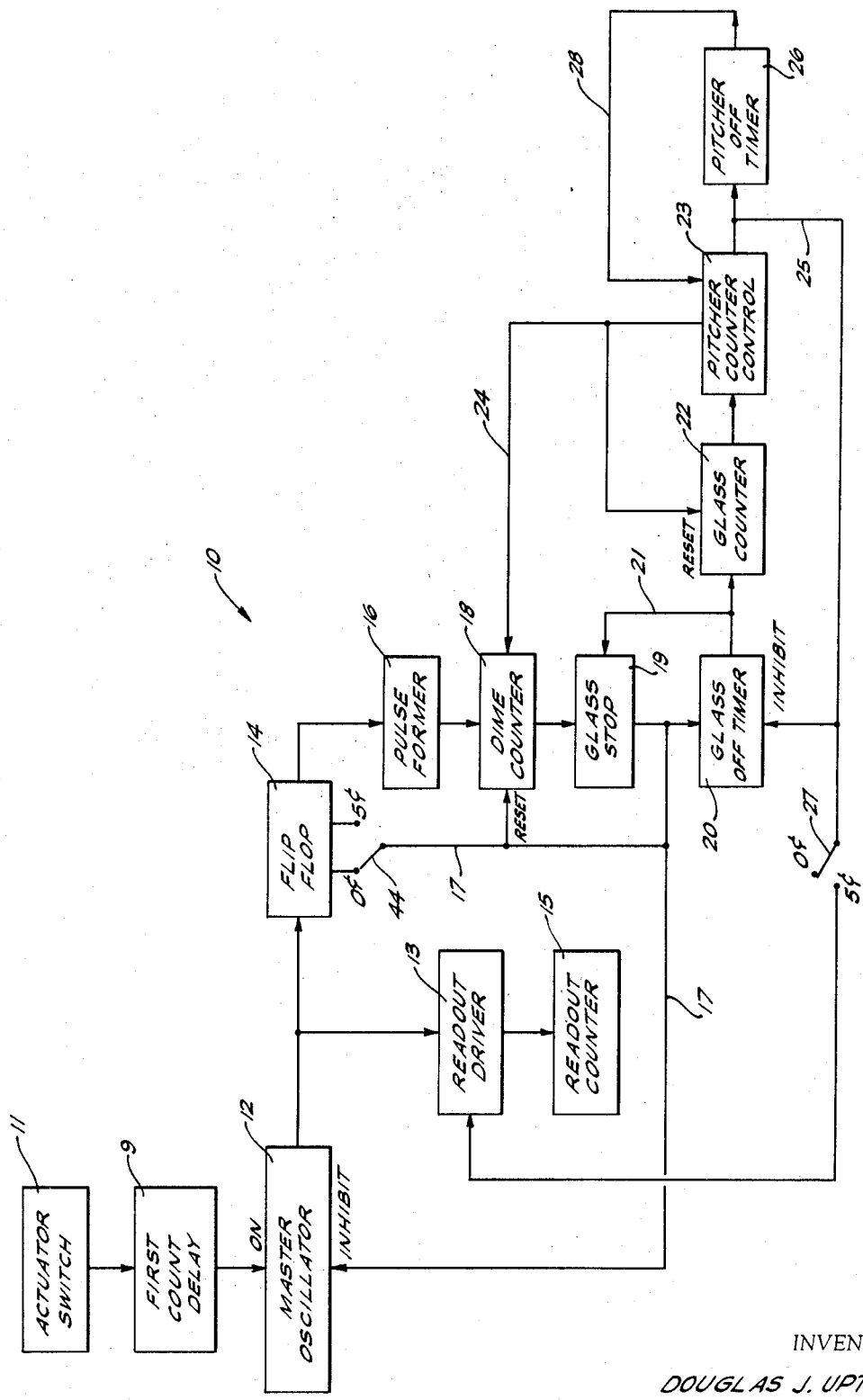

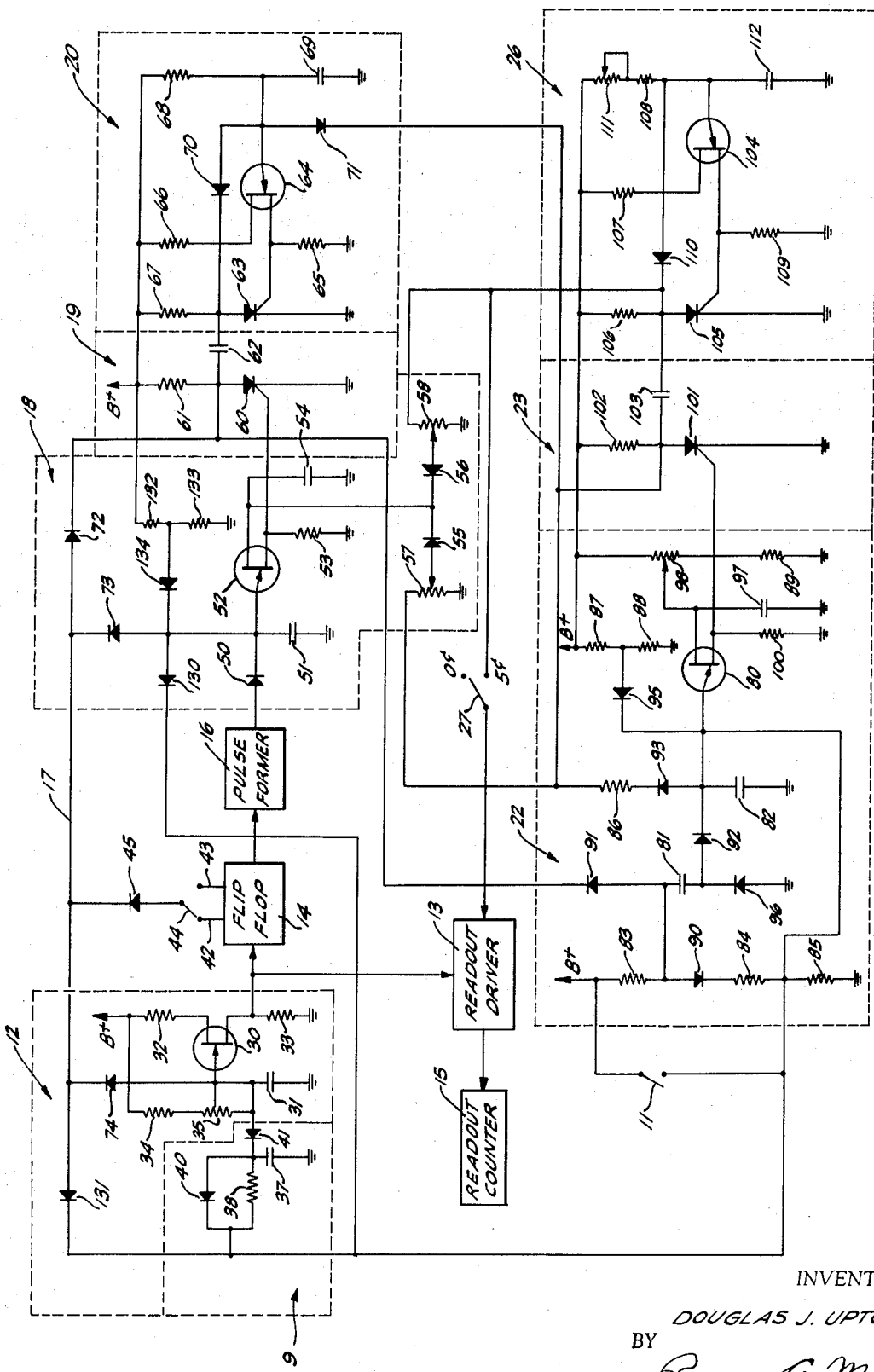

INVENTOR.
DOUGLAS J. UPTON
BY
Roger G. Marrs

FLUID DISPENSING MONITOR

BACKGROUND OF THE INVENTION

1. Field of the Invention

The present invention relates to an improved fluid dispensing monitor and, more particularly, to an apparatus for accurately indicating the equivalent monetary value of a volume of liquid dispensed into containers having different sizes and different prices per unit volume even through a different amount of liquid may be required to properly fill containers having the same size and the same price per unit volume.

2. Description of the Prior Art

Many different types of liquids are dispensed into containers of various sizes and then sold under circumstances wherein it is desirable to be able to monitor the volume of liquid dispensed. This is most often the case where the liquids are dispensed from a very large container into smaller containers in which they are sold. For example, in the sale of soft drinks, although the beverages are most often dispensed in bottles and cans of fixed volume and price, many situations exist, such as at sporting events, theaters, restaurants, etc, where the beverages are stored in large containers and dispensed through hand operated spigots into cups or glasses. Another example is in the case of beer, where in taverns, the beer is stored in large kegs and subsequently dispensed through hand operated spigots into glasses and pitchers.

A common problem experienced by the owners of establishments which sell beverages in this manner is that of monitoring the volume of liquid dispensed in a period of time. Substantial losses may be incurred because of the inability of the owner to check cash receipts with the volume of liquid dispensed. For example, the spigot operators have been known to dispense larger volumes of liquid while reporting sales of smaller amounts. Further, waiters or waitresses may withhold a portion of cash paid by table customers and report a lesser number of sales than actually occurred.

Still further, even if the spigot operators, waiters and waitresses make honest reports of sales, there may still be problems because of the techniques used to dispense the beverages. For example, in the sale of carbonated beverages, the operator is usually required to first fill the container with ice. On the one hand, if an insufficient amount of ice is placed in the container, the operator will have to dispense a larger amount of beverage than he should in order to fill the container. On the other hand, if he fills the container with too much ice, he will dispense an insufficient amount of beverage which may result in the loss of customers for the owner. Where beer is dispensed, there is a proper and an improper way to fill a glass or pitcher. If the glass or pitcher is filled improperly, the taste of the beer is greatly impaired and again this may result in the loss of customers.

Thus, there exists a need for a monitoring device for tallying the volume of liquid dispensed from a spigot and for providing the owner with an accurate indication of the equivalent monetary value of the amount of liquid dispensed.

A discussion of the prior art attempts to control and record the volume of fluid dispensed is contained in my U.S. Pat. No. 3,467,279, issued Sept. 16, 1969 for Fluid Dispensing Monitor. As stated therein, the most common type of available fluid dispensing monitor includes a valve actuated by a timer which is started by manually depressing one of a group of buttons located near the valve. When a button is pushed, liquid flows through the valve for a fixed period of time, at the end of which the valve automatically closes and the transaction is counted. This system has numerous disadvantages, the primary one of which is that small additional quantities of fluid cannot be added, e.g., to compensate for foam. Furthermore, both customers and bartenders are acutely aware of the systems presence.

To overcome the disadvantages of such systems, the before-mentioned copending patent application describes and claims a fluid dispensing monitor which provides a direct indication of the equivalent monetary value of a volume of liquid dispensed through a valve. An accurate tally is provided even through the liquid may be dispensed in glasses and pitchers having different prices per unit volume and even though consecutive glasses or pitchers may be dispensed without closing the spigot. However, even through the system disclosed therein is effective to overcome most of the problems of the prior art, a still further problem exists which heretofore has remained unsolved. More specifically, and with reference to the dispensing of keg beer into pitchers and glasses, there are many different factors which affect the amount of time that it takes to properly fill a glass of beer. The beer is stored in kegs and dispensed through a valve, when opened, into the glasses and pitchers. Compressed $CO_2$ is utilized to drive the beer from the kegs into and out of the spigots. Under a given set of circumstances, when the spigot is opened, it will take a measurable amount of time for a given volume of beer to be dispensed through the spigot. However, as the temperature of the beer in the keg changes, or the pressure of the beer or $CO_2$ changes, this amount of time may vary. Furthermore, even through the volume of beer per unit time coming through the spigot may remain constant, external factors may change the amount of time necessary to fill a glass or pitcher. More specifically, with respect to a glass, the degree of cleanliness of the glass, its temperature, and the angle at which it is held relative to the spigot all effect the amount of time necessary to properly fill a glass of beer.

SUMMARY OF THE INVENTION

According to the present invention, there is provided an improved fluid dispensing monitor which substantially overcomes these problems of the prior art. More specifically, the present fluid dispensing monitor provides, as was the case with the fluid dispensing monitor described in the beforementioned U.S. Pat. application, a direct indication of the equivalent monetary value of a volume of fluid dispensed through a valve even though the fluid may be dispensed in glasses and pitchers having different prices per unit volume, and even though consecutive glasses or pitchers may be dispensed without closing the spigot. In addition, however, the present fluid dispensing monitor is operative to compensate for the varying conditions under which a liquid is poured. In the first instance, the present fluid dispensing monitor indicates the price of a glass or a pitcher before the glass or pitcher is completely filled and ceases operation for a period of time sufficient to enable the glass or pitcher to be completely filled. In this manner, the varying time that it takes to fill different glasses and different pitchers are compensated for and an accurate tally is maintained. In addition, the present monitor provides a time delay between the time of the opening of the spigot and the start of the fluid dispensing monitor. This time delay is provided so that after a glass of beer is filled, the bartender may "splash some suds" onto the top of the beer to enhance the appearance of its head.

Briefly, the present improved fluid dispensing monitor includes a master oscillator which is actuated by the opening of the spigot to generate a series of pulses, each pulse indicating five cents worth of liquid sold, the pulses being supplied to a readout counter which continuously provides an accurate tally of the volume of liquid dispensed. Simultaneously, the pulses from the master oscillator are transmitted to a second counter which continuously counts the number of pulses. When this counter reaches a count indicative of one glass of liquid, a pulse is generated to turn off the master oscillator for a first predetermined period of time sufficient to enable the glass to be completely filled. At the end of this time, the master oscillator resumes operation. Simultaneously, a third counter is counting the number of glasses of liquid dispensed. When this counter reaches a count indicative of the price of a pitcher of liquid a pulse is applied to a circuit which is effective to turn off the master oscillator for a second predetermined period of time sufficient to completely fill the pitcher of liquid. At the end of this time period, all counters are reset and the cycle repeats.

It is therefore an object of the present invention to provide an apparatus for monitoring the volume of fluid dispensed through a valve and for providing an indication of the equivalent monetary value thereof.

It is a further object of the present invention to provide a fluid dispensing monitor for indicating the equivalent monetary value of a volume of liquid dispensed in containers having different sizes and different prices per unit volume.

It is a still further object of the present invention to provide a fluid dispensing monitor which will accurately indicate the equivalent monetary value of a volume of liquid dispensed in a series of containers having the same size even through a different volume of liquid may be required to properly fill each container.

It is another object of the present invention to provide an apparatus for monitoring the volume of fluid dispensed through a valve which incorporates an entrance time delay to permit a small amount of liquid to be dispensed without altering the output indication.

It is still another object of the present invention to provide a fluid dispensing monitor which will correctly tally the equivalent monetary value of glasses or pitchers of liquid dispensed consecutively without closing the spigot after each unit is filled.

Still other objects, features, and attendant advantage of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a block diagram of the present improved fluid dispensing monitor;

FIG. 2 is a schematic circuit diagram of the fluid dispensing monitor of FIG. 1.

DESCRIPTION OF THE PREFERRED EMBODIMENT

Figure 4:
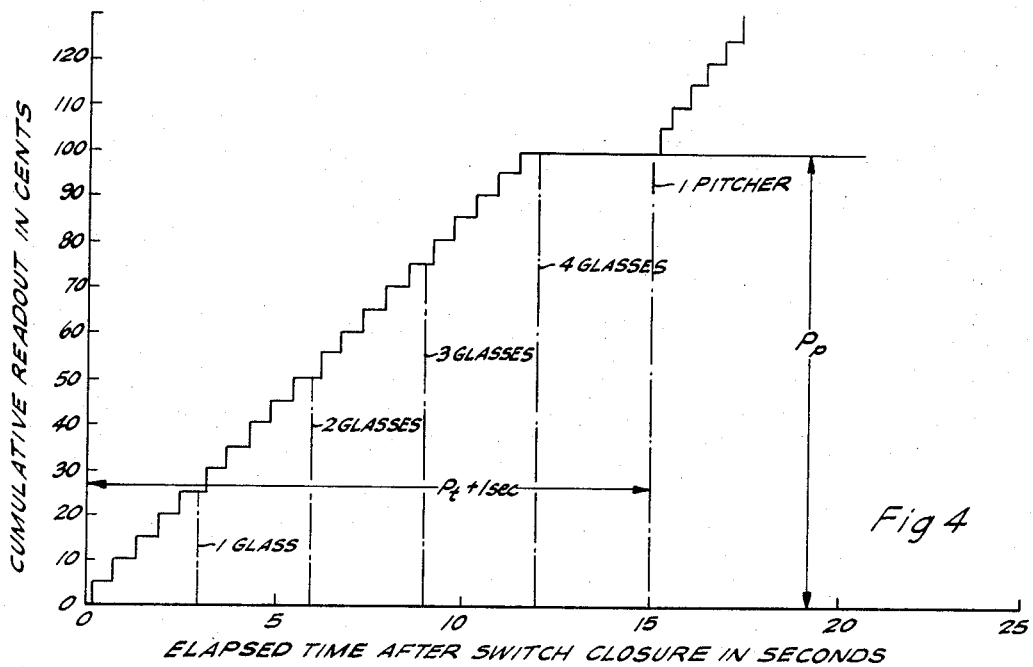
FIGS. 3 and 4 are graphs of the cumulative meter readout in cents as a function of elapsed time after switch closure for the circuits of FIGS. 1 and 2.

Referring now to the drawings and, more particularly, to FIG. 1 thereof, the present fluid dispensing monitor, generally designated 10, is designed to provide a direct indication of the equivalent monetary value of a dispensed volume of any type of liquid, such as beer or carbonated beverages. For convenience, however, monitor 10 will be described with reference to the dispensing of keg beer into glasses and pitchers.

Fluid dispensing monitor 10 is responsive to the operation of an actuator switch 11 which is adapted to be mounted on the handle of a beer dispensing spigot in such a manner that when the handle is moved to open the spigot, actuator switch 11 is closed. For examples of various types of actuator switches which may be used with the present invention, reference should be had to the beforementioned copending patent application Ser. No. 618,958.

Closure of switch 11 is operative, after a preset time interval determined by a first count delay circuit 9, to turn on a master oscillator 12 which forms a time base for monitor 10. The output of oscillator 12, which is a series of substantially uniformly spaced pulses, is applied to the inputs of a readout driver 13 and a flip-flop 14. Readout driver 13 is simply a pulse shaper and amplifier which receives the pulses from master oscillator 12, widens and amplifies them, and drives a readout counter 15. Readout counter 15 may be any standard type of counter which is operative to increment one count upon the receipt of a pulse at its input. As will be explained more fully hereinafter, readout counter 15 increments five cents for each pulse received from readout driver 13.

Flip-flop 14 is a standard bi-stable multivibrator which receives one pulse for each cycle of master oscillator 12. Flip-flop 14 divides the pulses by two and feeds one pulse to a pulse former 16 for each two pulses it receives. Flip-flop 14 can rest with either of its two stages conducting. However, as will be explained more fully hereinafter, a switch 44 which receives a signal over a line 17, assures that when stopped, it will always be with the same stage conducting.

Pulse former 16 receives square pulses from flip-flop 14, one pulse for each 10 cents counted, shapes and amplifies these pulses, and delivers them to a dime counter 18. Dime counter 18 is includes a capacitor which is charged one step at a time by the pulses received from pulse former 16. When the charge on this capacitor reaches a predetermined firing potential, which is a function of the cost of one glass of beer, dime counter 18 delivers a pulse to a glass stop circuit 19. When glass stop circuit 19 receives a pulse from dime counter 18, it applies a signal to line 17 which turns off master oscillator 12, resets dime counter 18, and starts the operation of a glass off timer 20. The signal on line 17 also assures that flip-flop 14 is resting with the proper stage on. Under these conditions, with master oscillator 12 turned off, readout counter 15 receives no more pulses from readout driver 13. Therefor, even though switch 11 is still on and beer is still being dispensed from the associated spigot, readout counter 15 does not change its count. Accordingly, during a predetermined interval of time determined by glass off timer 20, the glass can be completely filled to take into consideration the variable effects which determine the pour time of the glass without effecting the count on readout counter 15.

After the predetermined interval, glass off timer 20 times out applying a pulse over a line 21 to glass stop 19. This signal resets glass stop 19 thereby removing the signal from line 17. Accordingly, master oscillator 12 resumes operation and dime counter 18 begins counting pulses from pulse former 16.

Simultaneously with the resetting of glass stop 19, a signal is applied from glass off timer 20 to a glass counter 22. In other words, after each glass is dispensed, a pulse is fed to glass counter 22 which includes a capacitor which is charged one step by each received pulse. When the voltage across this capacitor reaches a level which indicates that the equivalent monetary value of the volume of liquid dispensed is within one glass of equalling the price of a pitcher, glass counter 22 feeds a pulse to a pitcher counter control 23. When the pitcher counter control 23 receives such a pulse from glass counter 22, it simultaneously performs several operations. In the first instance, it applies a signal over a line 24 to dime counter 18 to change the voltage level at which time the capacitor therein will fire. At the same time, pitcher counter control 23 resets glass counter 22 and applies a signal over a line 25 to start the operation of a pitcher off timer 26. This signal is also applied to glass off timer 20 as an inhibiting signal and via a switch 27, when closed, to readout driver 13. Since the cost of a pitcher is not necessarily an even multiple of the cost of a glass, the signal from pitcher counter control 23 over line 24 to dime counter 18 permits dime counter 18 to continue counting until the equivalent monetary value of the volume of liquid dispensed, as indicated by readout counter 15, is equal to the price of a pitcher. When this occurs, dime counter 18 fires triggering glass stop 19. Glass stop 19 turns off master oscillator 12, resets dime counter 18, and resets flip-flop 14. Normally, glass stop 19 would also start the operation of glass off timer 20. However, since a much greater period of time than that provided by glass off timer 20 may be required to fill the pitcher, the signal on line 25 from pitcher counter control 23 prevents glass off timer 20 from starting its timing cycle.

Pitcher off timer 26 is a timing circuit that permits the pitcher to be completely filled after the price thereof has been reached. At the end of this period of time, pitcher off timer 26 applies a signal over line 28 to pitcher counter control 23 to reset pitcher counter 23. When reset, pitcher counter control 23 removes the signal from dime counter 18 and removes the inhibiting voltage from glass off timer 20. Glass off timer 20 is then permitted to time out and apply a resetting signal over line 21 to glass stop 19. As explained previously, when glass stop 19 is reset, master oscillator 12 turns on allowing the complete cycle to start over again for the next glass or pitcher.

Referring now to FIG. 2, master oscillator 12 is a conventional unijunction transistor relaxation oscillator consisting of a unijunction transistor 30, a capacitor 31, biasing resistors 32–34, diodes 74 and 131, and a potentiometer 35, the moveable arm of which is connected to the gate electrode of unijunction transistor 30. As explained previously, oscillator 12 forms a time base for fluid dispensing monitor 10. Potentiometer 35 controls the frequency of the oscillator over a range which would typically be from .5 cps to 8 cps. Each cycle of oscillation forms a pulse across resistor 33 which is fed to readout driver 13 and flip-flop multivibrator 14. According to a preferred embodiment of the present invention, each pulse from oscillator 12 represents 5¢ worth of beer. Accordingly, potentiometer 35 is adjusted so that the number of pulses generated during the period of time it takes to dispense one glass of beer is equal to the price of the glass divided by 5. These pulses are applied to readout driver 13 which causes readout counter 15 to increment five cents for each pulse received.

First count delay circuit 9 includes a capacitor 37, a resistor 38, and diodes 40 and 41. As will be explained more fully hereinafter, delay circuit 9 is inserted between switch 11 and oscillator 12 so that upon closure of switch 11, capacitor 37 must be charged along with capacitor 31 before a pulse can be generated by unijunction transistor 30. Accordingly, it takes a longer amount of time to generate the first pulse than it does to generate each succeeding pulse. This added period of time is provided so that the bartender may add a small amount of beer to a glass without incrementing readout counter 15.

As explained previously, flip-flop 14 is a bistable multi-vibrator having first and second stages. Flip-flop 14 receives one pulse for each cycle of master oscillator 12, divides the pulses by two, and feeds one pulse to pulse former 16 for each two pulses it receives. Flip-flop 14 can rest with either stage conducting. However, flip-flop 14 is provided with first and second inputs 42 and 43, one of which is connected via switch 44 and a diode 45 to the output of glass stop 19. By positioning switch 44 in contact with either input 42 or 43, flip-flop 14 when stopped, will always rest with the same stage conducting. As will be explained more fully hereinafter, this enables a glass costing and even or odd number of nickels to be counted.

The output of flip-flop 14 is transmitted via pulse former 16 and a diode 50 to a capacitor 51 in dime counter 18. Dime counter 18 is a unijunction relaxation oscillator consisting of a unijunction transistor 52, resistors 53, 132 and 133, capacitors 51 and 54, diodes 50, 55, 56, 72, 73, 130 and 134, and potentio-meters 57 and 58. Each pulse transmitted by pulse former 16 through diode 50 charges capacitor 51 one step, the initial charge on capacitor 51 being established by resistors 132 and 133 via diode 134. When the charge on capacitor 51 reaches the firing potential of transistor 52, it oscillates one cycle delivering a pulse to the gate electrode of a silicon controlled rectifier (SCR) 60 in glass stop circuit 19. As will be explained more fully hereinafter, either potentiometer 57 or 58 controls the firing point of transistor 52.

Glass stop circuit 19 includes SCR 60, a resistor 61 and a capacitor 62 which is connected to the anode of a second silicon controlled rectifier 63 in glass off timer 20. Glass off timer 20 further includes a unijunction transistor 64, bias resistors 65, 66, 67 and 68, a timing capacitor 69 and diodes 70 and 71.

SCR 60 conducts when it receives a pulse from unijunction transistor 52. When SCR 60 conducts, its anode voltage drops to essentially ground level. This ground level is conducted via diodes 72 and 73 to discharge capacitor 51, via diodes 72 and 45 to reset flip-flop 14 to the desired state, and via diodes 72 and 74 to deactivate master oscillator 12. Diode 131, however, prevents capacitor 37 from being discharged. Simultaneously, the negative pulse generated at the anode of SCR 60 is transmitted through capacitor 62 to the anode of SCR 63 causing SCR 63 to stop conducting thereby starting the timing cycle of glass off timer 20.

Conduction of SCR 60, in the manner just described, holds master oscillator 12 off. When SCR 60 starts conducting, SCR 63 is turned off. When SCR 63 was conducting, capacitor 69 was shorted to ground by diode 70 and SCR 63. Now, with SCR 63 turned off, capacitor 69 starts charging through resistor 68. Approximately one-half second later, the voltage on capacitor 69 reaches the firing voltage of unijunction transistor 64 which fires, discharging capacitor 69 across resistor 65 causing SCR 63 to conduct. When SCR 63 conducts, the negative pulse at its anode is transmitted through capacitor 62 to SCR 60 turning SCR 60 back off. When SCR 60 turns off, the inhibiting signal on line 17 is removed, master oscillator 12 resumes oscillation, and the cycle repeats.

Glass counter 22 consists primarily of a unijunction transistor 80 and capacitors 81 and 82. Additional circuit elements include resistors 83–89 and 100, diodes 90–96, a capacitor 97 and a potentiometer 98.

With SCR 60 non-conducting, when switch 11 is closed, the potential at the junction between resistor 83 and diode 90 forms a positive pulse which is fed trough capacitor 81 and diode 92 to capacitor 82. Similarly, when SCR 60 stops conducting at the end of the glass off timer cycle, a pulse is fed via diode 91, capacitor 81, and diode 92 to capacitor 82. In either event, capacitor 82 is charged one step when switch 11 is closed and at the end of each glass, the initial charge on capacitor 82 being established by resistors 87 and 88 via diode 95. The reason why a pulse is fed into capacitor 82 when switch 11 is closed will become more apparent hereinafter.

Capacitor 82 continues to charge until the firing point of unijunction transistor 80 is reached. This firing point is adjusted by potentiometer 98. When unifunction transistor 80 fires, capacitor 82 is discharged across resistor 100 delivering a pulse to the gate electrode of a silicon controlled rectifier 101 in pitcher counter control 23. Pitcher counter control 23 includes SCR 101, a resistor 102, and a capacitor 103 which is connected to the anode of a silicon controlled rectifier 105 in pitcher off timer 26. Pitcher off timer 26 further consists of a unijunction transistor 104, resistors 106, 107, 108 and 109, a diode 110 and a potentiometer 111.

When capacitor 82 discharges across resistor 100, a pulse is fed to the trigger electrode of SCR 101 causing it to conduct. When SCR 101 is not conducting, a positive voltage from resistor 102 is fed to potentiometer 57 which controls the firing of transistor 52. On the other hand, when SCR 101 conducts, a negative pulse is applied via capacitor 103 to the anode of SCR 105 causing it to stop conducting. The voltage across potentiometer 57 is now reduced to near zero whereas a positive voltage is applied to potentiometer 58 via resistor 106 and line 24. Accordingly, potentiometer 58 now controls the firing point of unijunction transistor 52. Therefore, when SCR 101 fires, dime counter 18 continues to operate. However, when the voltage on capacitor 51 reaches the new firing level of unijunction transistor 52, it fires causing SCR 60 to conduct. This conduction of SCR 60 turns off master oscillator 12, resets dime counted 18 and flip-flop 17 and would normally start glass off timer 20 operating. However, capacitor 69 is shorted to ground through a connection consisting of diode 71 and SCR 101 which is now conducting. At this time, however, pitcher off timer 26 is operating since the price of pitcher is generally reached before the pitcher is full. In other words, when SCR 105 is turned off, capacitor 112 starts charging through resistor 108 and potentiometer 111. When the charge across capacitor 112 reaches the firing point of unijunction transistor 104, transistor 104 conducts causing capacitor 112 to discharge through resistor 109. This positive pulse across resistor 109 fires SCR 105 which turns off SCR 101 by applying a positive pulse to the anode thereof via capacitor 103. When SCR 101 turns off, the clamping of capacitor 69 through diode 71 is removed allowing glass off timer 20 to time out as explained previously. In other words, when capacitor 69 charges through resistor 68 to the firing point of transistor 64, it conducts turning SCR 63 on, turning SCR 60 off and allowing the complete cycle to start over again for the next glass or pitcher.

Figure 3:
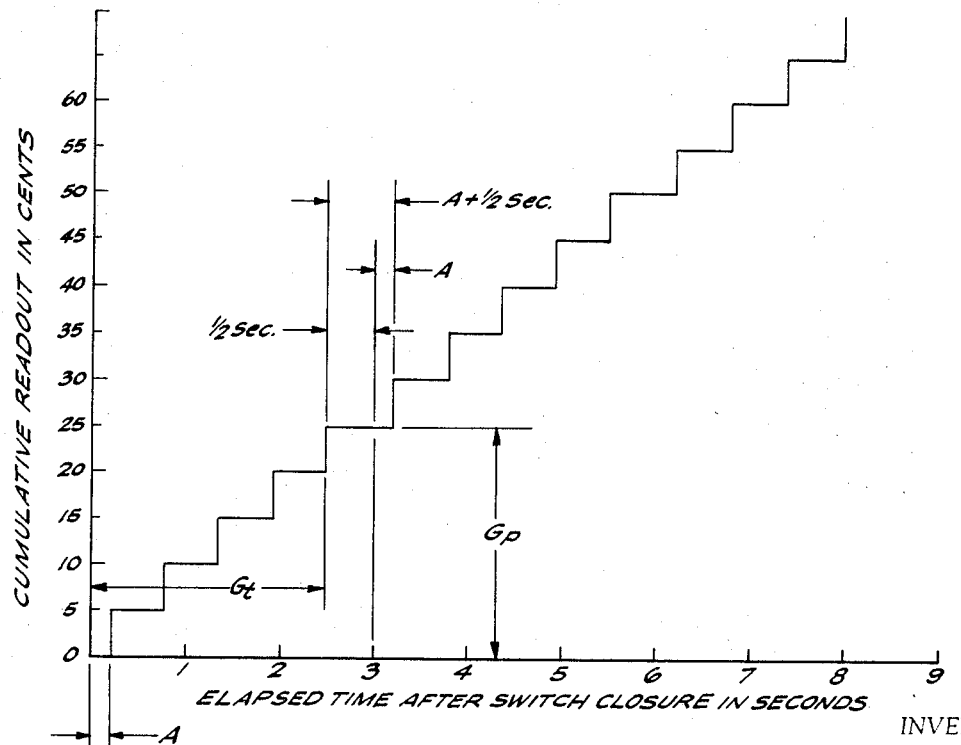

In operation, fluid dispensing monitor 10 is operative to monitor the volume of liquid dispensed through a valve and to provide an indication of the equivalent monetary value of the dispensed liquid. In addition, monitor 10 provides an accurate indication of the equivalent monetary value even though the liquid is dispensed in containers having different sizes and different prices per unit volume. Finally, monitor 10 is operative to give an accurate indication of the equivalent monetary value of a volume of liquid dispensed even though the time it takes to fill containers of the same size varies from container to container. In order to perform this function, several items of data for each spigot must be ascertained. This data includes: (1) the price a glass of beer is sold for, $G_p$; (2) the length of time it takes to pour a glass of beer, $G_t$; (3) the price a pitcher of beer is sold for, $P_p$; and (4) the length of time it takes to pour a pitcher of beer, $P_t$. In addition, approximately one-half second is added to $G_t$ to compensate for changing environmental conditions so that the equivalent monetary value indicated by readout counter 15 is always accurate. Similarly, approximately one second is added to $P_t$ for the same reason. One additional compensation is provided. After a glass of fluid, such as beer, is dispensed, the bartender often opens the spigot again momentarily to add some head to the glass of beer. In FIG. 3, this time interval is indicated as interval A. Therefore, it is necessary that a time delay exist between the closing of switch 11 and the generation of pulses by oscillator 12. For this purpose, when switch 11 is closed, capacitors 37 and 31 begin to charge. It is not until both capacitors are fully charged that transistor 30 fires genrating the first pulse. If switch 11 remains closed, capacitor 37 remains charged due to the biasing of diode 41 and capacitor 31 alone effects the timing cycle of master oscillator 12. However, the additional time to place the initial charge on capacitor 37 provides the time delay A. In a typical case, $A = 0.2$ seconds.

There are seven adjustments in fluid dispensing monitor 10 which must be set properly to insure proper operation. These adjustments are:
1. Switch 44
2. Switch 27
3. The glass charge adjustment, $G_p$, potentiometer 57.
4. The glass pour time adjustment, $G_p$, potentiometer 35.
5. The number of glasses adjustment, N, potentiometer 98.
6. The pitcher charge adjustment, R, potentiometer 58.
7. The pitcher pour time adjustment, $P_t$, potentiometer 111. The only remaining unknowns are the number of glasses adjustment N and the pitcher charge adjustment R. These numbers are obtained by the formula:

$$(P_p/G_p) = N \text{ and } R$$

In other words, by dividing the selling price of a pitcher by the selling price of a glass, a whole number N is derived together with a remainder R. Because of the design of fluid dispensing monitor 10, R must always be 15 cents or more. If it is 10 cents, 5 cents, or 0 cents, the price of one glass of beer must be added to it and the price of one glass subtracted from N. For example, assume a glass of beer sells for 25 cents and a pitcher of beer sells for $1.00, 25 cents will go into $1.00 four times with the result being $N=4$, $R=0$. Therefore, the price of one glass must be added to R with the final solution being $N=3$, $R=25$ cents.

Let us now take a hypothetical faucet. We will say that it takes 2.5 seconds to pour a glass of beer to the level the owner desires. Adding a half second to it, $G_t + (\frac{1}{2}) = 3.0$ seconds. The pitcher of beer sells for $1.00, therefor $P_p = \$1.00$. Also assume that it requires 14 seconds to fill the pitcher to the level the owner desires. Adding one second, $P_t + 1 = 15$ seconds. With reference to FIGS. 1–4, potentiometer 35 is adjusted so that under normal operation conditions, it takes 2½ seconds minus A seconds to generate five pulses. Accordingly, when switch 11 is closed, master oscillator is turned on and after the delay caused by the charging of capacitor 37, pulses are provided to readout driver 13 which increment readout counter 15. The same pulses are applied via flip-flop 14 and pulse former 16 to dime counter 18. Each pulse applied to dime counter 18 represents 10 cents worth of beer dispensed due to the operation of flip-flop 14. At the start of each cycle, flip-flop 14 is in rest with one of its two stable states conducting. Switch 44 assures that when stopped it will always be with the same stage conducting. This enables a glass costing in even or odd number of nickels to be counted. In other words, if a glass of beer costs an even multiple of 10 cents, switch 44 is connected to terminal 42 and pulses are transmitted to dime counter 18 representing 0 cents, 10 cents, 20 cents, etc. On the other hand, if switch 44 is in contact with terminal 43, flip-flop 14 starts with the other stage conducting so that pulses are applied to dime counter 18 representing 5 cents, 15 cents, 25 cents, etc.

Potentiometer 57 is adjusted as a function of the glass price, $G_p$. In the present case, since $G_p$ equals 25 cents, potentiometer 57 is adjusted so that unijunction transistor 52 will fire when the charge on capacitor 51 reaches 25 cents. As explained previously, when unijunction transistor 52 fires, SCR 60 conducts turning off master oscillator 12. At this point, five pulses have been applied to readout counter 15 so that it reads 25 cents. Glass off timer 20 now times an interval approximately equal to 0.7 seconds which is sufficient time to enable an additional amount of beer to be added to the glass to compensate for an under-filled glass plus the initial delay of 0.2 seconds. If a glass only is being poured and switch 11 is opened during this 0.7 second interval, the entire circuit is reset to its initial starting conditions. More specifically, capacitor 51 discharges either through diodes 73, 72 and SCR 60 if switch 11 remains closed or discharges through diode 130 and resistor 85 if switch 11 is opened. Similarly, when switch 11 is opened, capacitors 37 and 31 discharge through resistor 85. It should further be noted that in the event switch 11 is again closed before capacitors 51 and 82 are completely discharged, these capacitors are initially precharged through the voltage divider networks consisting of resistors 132 and 133, and resistors 87 and 88, respectively.

With reference to FIGS. 2 and 4, and using the example given previously, readout counter 15 will read out the price of a pitcher of beer, $1.00 at the end of 12 seconds. However, it normally takes at least 14 seconds to fill a pitcher of beer. Therefore, it is necessary to stop master oscillator 12 after readout counter 15 reaches $1.00 and to hold master oscillator 12 off for an amount of time sufficient to enable the pitcher of beer to be completely filled. Accordingly, at the end of each cycle of glass off timer 20, a pulse is fed via diode 91, capacitor 81 and diode 92 to charge capacitor 82. In addition, in accordance with the equation previously given, potentiometer 98 is adjusted so that unijunction transistor 80 will fire at the end of three glasses. Accordingly, at the end of the third glass, unijunction transistor 80 fires rendering SCR 101 conductive and SCR 105 non-conductive. When this occurs, the voltage from potentiometer 57 is removed and a voltage is applied to potentiometer 58. Simultaneously, pitcher off timer 26 begins to time an interval sufficient to completely fill the pitcher of beer. At this point, master oscillator 12 is still counting, and dime counter 18 is counting up to a count determined by the setting of potentiometer 58. When a number of pulses are received by capacitor 51 which indicates that readout counter 15 has reached $1.00, unijunction transistor 52 fires rendering SCR 60 conductive. As before, this turns off master oscillator 12 and would normally start the timing cycle of glass off timer 20 except for the fact that capacitor 69 is shorted to ground via diode 71 and SCR 101. However, when capacitor 112 reaches a charge indicating that a sufficient amount of time has elapsed to completely fill the pitcher plus an allowable under pour time, unijunction transistor 104 fires turning SCR 105 on and SCR 101 off. This removes the clamp from capacitor 69 permitting it to time out. At the end of the time period, SCR 60 turns off and the cycle repeats.

It should be noted that when SCR 60 is turned back on to repeat the entire cycle, a pulse is transmitted via diode 91 to charge capacitor 82. Accordingly, at the start of each pitcher cycle, capacitor 82 is precharged to the value 1. Therefore, in order to insure the proper operation of the circuit, when switch 11 is initially closed, a precharge of one pulse is applied to capacitor 82 via diode 90.

An additional fact should be noted. Since dime counter 18 always counts in 10 cent increments, if the glass charging time is an odd number of nickels, the pitcher time will also be an odd number of nickels. If the former is even, the latter will be even. However, at times it will be necessary to have one odd and the other even due to the price of one glass and the price of one pitcher. When this is necessary, switch 27 is closed. This causes a pulse to be transmitted to readout driver 13 to add five cents to the count in readout counter 15. This 5 cents is added when SCR 105 stops conducting.

While the invention has been described with respect to a preferred physical embodiment constructed in accordance therewith, it will be apparent to those skilled in the art that various modifications and improvements may be made without departing from the scope and spirit of the invention.

I claim:

1. A device for monitoring the volume of liquid dispensed
   in a series of containers having substantially the same size, the liquid being dispensed by an apparatus of the type including a spigot having open and closed positions and an electrical switch which is actuated when said spigot is in its open position, comprising:
   readout means for indicating the monetary value of the volume of liquid dispensed through said spigot, said readout means being operative, in response to actuation of said switch, to increment the monetary value within a predetermined monetary range at a substantially uniform rate;
   means operative after a first predetermined interval of time equal to the maximum value in the monetary range for inhibiting the incrementing of said readout means for a second predetermined interval of time, said first interval of time being approximately equal to the shortest time interval required to fill one of said containers;
   said readout means resumes incrementing the monetary value at a substantially uniform rate upon the expiration of said second predetermined interval of time; and
   said apparatus is adapted for dispensing said liquid into containers of two different sizes, the larger containers having smaller monetary values per unit volume, further comprising:
   means operative after a third predetermined interval of time for inhibiting the incrementing of said readout means for a fourth predetermined interval of time, said third interval being longer than said first interval and being equal to the interval required for said readout means to indicate the monetary value of said larger containers, said fourth interval of time being sufficient to completely fill said larger containers.

2. A device according to claim 1 wherein said first interval of time starts concurrently with the actuation of said switch and wherein said second interval of time starts at the termination of said first interval of time.

3. A device according to claim 1 wherein said first predetermined interval of time is adjustable.

4. A device according to claim 1 further comprising:
   time delay means interposed between said switch and said readout means for delaying for a third predetermined interval of time the incrementing of said indicated value after actuation of said switch.

5. A device according to claim 1 wherein said third interval of time starts concurrently with said first interval of time.

6. A device according to claim 1 wherein said fourth interval of time includes an interval of time which is approximately equal to the difference between the shortest and longest intervals required to fill one of said larger containers.

7. A device according to claim 1 wherein said first, third and fourth intervals of time are adjustable.

8. A device according to claim 1 wherein said readout means resumes incrementing the monetary value at a substantially uniform rate upon the expiration of said fourth predetermined interval of time.

9. A device for monitoring the volume of liquid dispensed by an apparatus of the type including a spigot having open and closed positions and an electrical switch which is actuated when said spigot is in its open position, comprising:
   circuit means responsive to the actuation of said switch for generating a train of pulses, each of said pulses indicative of a fixed monetary amount;
   readout means responsive to said train of pulses for indicating the monetary value of the volume of liquid dispensed through said spigot;
   means for counting the number of pulses in said train of pulses;
   means responsive to the number of counted pulses reaching a predetermined count for deactivating said generating means for a first predetermined interval of time; and
   said means for deactivating said generating means is further operative to reset said counting means; said generating means and said counting means resuming operation after said first predetermined interval of time.

10. A device according to claim 9 further comprising:
    time delay means interposed between said electrical switch and said generating means for delaying the generation of said train of pulses for an initial predetermined interval of time when said electrical switch is actuated.

11. A device according to claim 9 wherein said predetermined count of pulses is adjustable.

12. A device according to claim 9 wherein the spacing between said pulses in said train of pulses is adjustable.

13. A device for monitoring the volume of liquid dispensed by an apparatus of the type including a spigot having open and closed positions and an electrical switch which is actuated when said spigot is in its open position, comprising:

circuit means responsive to the actuation of said switch for generating a train of pulses, each of said pulses indicative of a fixed monetary amount;

readout means responsive to said train of pulses for indicating the monetary value of the volume of liquid dispensed through said spigot;

means for counting the number of pulses in said train of pulses;

means responsive to the number of counted pulses reaching a predetermined count for deactivating said generating means for a first predetermined interval of time; and said counting means comprising:

a capacitor which is charged one step at a time by each of said pulses in said train of pulses; and means responsive to the charge on said capacitor reaching a predetermined value for generating a signal, said signal being applied to said deactivating means.

14. A device according to claim 13 wherein said means for deactivating said generating means is further operative to reset said counting means; said generating means and said counting means resuming operation after said first predetermined interval of time.

15. A device according to claim 13 further comprising:

means for counting the number of times said generating means is deactivated;

means responsive to said generating means being deactivated for a predetermined number of times for changing the value of said predetermined count of pulses; and means responsive to the number of counted pulses reaching the new predetermined count for deactivating said generating means for a second predetermined interval of time.

16. A device according to claim 13 wherein said means for changing the value of said predetermined count of pulses is further operative to reset said means for counting the number of times said generating means is deactivated; said generating means and both said counting means resuming operation after said second predetermined interval of time.

* * * * *